United States Patent
Kim et al.

(10) Patent No.: US 9,681,266 B2
(45) Date of Patent: Jun. 13, 2017

(54) METHOD FOR ADJUSTING PROXIMITY SERVICE RANGE AND FILTERING METHOD THEREFOR

(71) Applicant: LG ELECTRONICS INC., Seoul (KR)

(72) Inventors: Hyunsook Kim, Seoul (KR); Jaehyun Kim, Seoul (KR); Laeyoung Kim, Seoul (KR); Taehyeon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/767,519

(22) PCT Filed: Feb. 26, 2014

(86) PCT No.: PCT/KR2014/001587
§ 371 (c)(1),
(2) Date: Aug. 12, 2015

(87) PCT Pub. No.: WO2014/137098
PCT Pub. Date: Sep. 12, 2014

(65) Prior Publication Data
US 2015/0382142 A1   Dec. 31, 2015

Related U.S. Application Data

(60) Provisional application No. 61/773,843, filed on Mar. 7, 2013, provisional application No. 61/923,776, filed on Jan. 6, 2014.

(51) Int. Cl.
*H04W 4/02* (2009.01)
*H04W 4/08* (2009.01)
*H04W 8/00* (2009.01)

(52) U.S. Cl.
CPC ............. *H04W 4/022* (2013.01); *H04W 4/08* (2013.01); *H04W 8/005* (2013.01)

(58) Field of Classification Search
USPC ........................ 455/41.1, 41.2; 370/328, 329
See application file for complete search history.

(56) References Cited

U.S. PATENT DOCUMENTS

2002/0184357 A1* 12/2002 Traversat ............. G06F 9/4416
709/223
2008/0026718 A1* 1/2008 Wangard .............. H04B 1/1027
455/266

(Continued)

FOREIGN PATENT DOCUMENTS

CN    WO 2009030114 A1 *  3/2009  ........... H04B 7/2606
KR    10-2008-0111352      12/2008

(Continued)

OTHER PUBLICATIONS

PCT International Application No. PCT/KR2014/001587, Written Opinion of the International Searching Authority dated Jun. 26, 2014, 1 page.

*Primary Examiner* — Nay A Maung
*Assistant Examiner* — Erica Fleming-Hall
(74) *Attorney, Agent, or Firm* — Lee Hong Degerman Kang & Waimey

(57) ABSTRACT

The present application provides a method for enabling a UE (User Equipment) detecting a proximity service to adjust the detection range. The method for adjusting the detection range includes the steps of: enabling the detecting UE having joined in the same group of the proximity service to compare the number of the UEs requiring a relay with a predetermined threshold value; enabling the detecting UE to decide whether to expand its detection range if the number of the UEs requiring a relay exceeds the predetermined threshold value; enabling the detecting UE to decide (Continued)

whether to reduce its detection range if the number of the UEs requiring a relay is less than the predetermined threshold value; and enabling the detecting UE to adjust the range class so as to expand or reduce the detection range.

12 Claims, 15 Drawing Sheets

(56) References Cited

U.S. PATENT DOCUMENTS

| | | | |
|---|---|---|---|
| 2008/0232323 | A1 | 9/2008 | Jeong et al. |
| 2010/0002582 | A1* | 1/2010 | Luft .................. H04W 74/0866 370/230.1 |
| 2010/0167743 | A1* | 7/2010 | Palanki .................. H04B 7/155 455/436 |
| 2011/0014911 | A1* | 1/2011 | Baldemair ........... H04B 7/2606 455/434 |
| 2012/0250531 | A1* | 10/2012 | Patil ...................... H04W 8/005 370/252 |
| 2013/0194962 | A1* | 8/2013 | Abraham .............. H04W 8/005 370/254 |
| 2013/0225166 | A1* | 8/2013 | Akhtar .................. H04W 24/02 455/435.1 |
| 2013/0331097 | A1* | 12/2013 | Kang .................... H04W 48/16 455/434 |
| 2015/0245193 | A1* | 8/2015 | Xiong ................. H04W 76/023 370/328 |
| 2015/0327180 | A1* | 11/2015 | Ryu .......................... H04L 1/00 370/329 |
| 2015/0341794 | A1* | 11/2015 | Vanderveen ....... G06Q 30/0261 705/14.58 |
| 2016/0262086 | A1* | 9/2016 | Bodas ...................... H04B 7/15 |

FOREIGN PATENT DOCUMENTS

| | | |
|---|---|---|
| KR | 10-2011-0028003 | 3/2011 |
| WO | 2008/134473 | 11/2008 |

* cited by examiner

METHOD FOR ADJUSTING PROXIMITY SERVICE RANGE AND FILTERING METHOD THEREFOR

CROSS-REFERENCE TO RELATED APPLICATIONS

This application is the National Stage filing under 35 U.S.C. 371 of International Application No. PCT/KR2014/001587, filed on Feb. 26, 2014, which claims the benefit of U.S. Provisional Application Nos. 61/773,843, filed on Mar. 7, 2013 and 61/923,776, filed on Jan. 6, 2014, the contents of which are all hereby incorporated by reference herein in their entirety.

BACKGROUND OF THE INVENTION

Field of the Invention

The present invention relates to a method for adjusting a proximity service range and a filtering method therefor.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| Reference point | Description |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the |

TABLE 1-continued

| Reference point | Description |
|---|---|
| | S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

FIG. 2 is an exemplary diagram showing the architecture of a common E-UTRAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re)selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5 is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 6a is an exemplary diagram showing common communication.

Referring to FIG. 6a, a UE#1 10-1 is present within the coverage of an eNodeB#1 20-1, and a UE#2 10-2 is present within the coverage of an eNodeB#2 20-2. Communication between the UE#1 10-1 the UE#2 10-2 may be performed via a core network, for example, an S-GW 52 and a P-GW 53. As such, a communication path via the core network is called an infrastructure data path. Furthermore, communication through this infrastructure data path is called infrastructure communication.

FIG. 6b shows the concept of proximity communication that is expected to be introduced in the next generation communication system.

Due to an increase in user requirements for Social Network Service (SNS), as demands for discovery and special applications/services between physically adjacent UEs, that is, demands for proximity-based applications/services appear, a need for proximity communication between the UEs is further increased.

In order to reflect the above-mentioned requirements, as shown in FIG. 6b, a scheme to enable a direct communication between a UE#1 10-1, a UE#2 10-2 and a UE#3 10-3 or between a UE#4 10-4, a UE#5 10-5 and a UE#6 10-6 without the intervention of an eNodeB 20 is under discussion. Surely, with the help of the eNodeB 20, the UE#1 10-1 and the UE#4 10-4 may directly communicate with each other. Meanwhile, the UE#1 10-1 may serve as a repeater for the UE#2 10-2 and the UE#3 10-3 that are distant from the center of a cell. Similarly, the UE#4 10-4 may function as a repeater for the UE#5 10-5 and the UE#6 10-6 that are distant from the center of a cell.

As described above, the introduction of proximity communication between UEs in the next generation system is being discussed.

However, the UE#1 10-1 or the UE#4 10-4 playing a role of a repeater has a problem that power consumption is rapidly increased.

To prevent a dramatic increase in power consumption, it is important to properly adjust relay coverage. However, since there was only a conceptual discussion on proximity communication to date and a specific technology for its implementation has not been presented, there is a problem that prevention measures of power consumption are not proposed.

SUMMARY OF THE INVENTION

Thus, the purpose of one embodiment of the present specification is to provide a scheme that can solve the above-mentioned problems.

To achieve the above purpose, one embodiment of the present specification provides a method for adjusting a discovery range for a proximity service. The method may be performed by a user equipment (UE) that performs discovery and comprise: Comparing, by the discovering UE that has joined the same group of the proximity service, the number of UEs requiring a relay with a predetermined threshold value; determining, by the discovering UE, whether an extension of its discovery range is required when the number of UEs requiring a relay exceeds the predetermined threshold value; determining, by the discovering UE, whether a reduction in its discovery range is required when the number of UEs requiring a relay is less than the predetermined threshold value; and expanding or reducing, by the discovering UE, the discovery range by adjusting the range class, according to the determination result.

The expanding or reducing step of the discovery range may comprise: transmitting a range class update request message to a network node according to the determination result; receiving the updated range class information from the network node; and adjusting the range class according to the received information.

The expanding or reducing step of the discovery range may comprise transferring the received information to an IP or Medium Access Control (MAC) layer to adjust the range class.

When the network node may be a Mobility Management Entity (MME), the range class update request message may be transmitted in a Non-Access-Stratum (NAS) message and transmitted, and the updated range class may be received in the NAS message.

The network node may be a proximity service-related server.

The method further comprise: generating a discovery request message including a field value according to the adjusted range class, in response to a discovery request, after the discovery range is expanded or reduced; and broadcasting the generated discovery request message with signal strength according to the adjusted range class.

Meanwhile, to achieve the above purpose, another embodiment of the present specification provides a method for filtering discovery by a proximity service. The method may comprise: receiving a discovery message; measuring the receive signal strength of the discovery message; extracting a value of a range class included in the discovery message; comparing the extracted value of the range class with the receive signal strength to calculate the distance; and filtering the discovery message, based on the calculated distance.

On the other hand, to achieve the above purpose, still another embodiment of the present specification provides a user equipment (UE) capable of adjusting a discovery range for a proximity service. The UE may comprise: a transceiver; and a controller operatively connected with transceiver thereby controlling the transceiver. The controller may be configured to: compare the number of UEs having joined the same group of the proximity service and requiring a relay with a predetermined threshold value; determine whether an extension of its discovery range is required when it is confirmed that the number of UEs requiring a relay exceeds the predetermined threshold value according to the comparison result; determine whether a reduction in its discovery range is required when the number of UEs requiring a relay is less than the predetermined threshold value according to the comparison result; and expanding or reducing the discovery range by adjusting a range class according to the determination result.

According to a first embodiment of the present specification, the adjustment of a range of discovery (and/or communication) for proximity service may be performed such that an efficient service can be provided. Furthermore, due to the adjustment of a range class, the burden on UE playing a role of relay may be reduced and the amount of battery consumption may also be decreased.

Additionally, according to a second embodiment of the present specification, a range class of discovery may be established per application or group, so a discovered UE may be prevented from being exposed by an undesired discovery.

DESCRIPTION OF EXEMPLARY EMBODIMENTS

Figure 1:
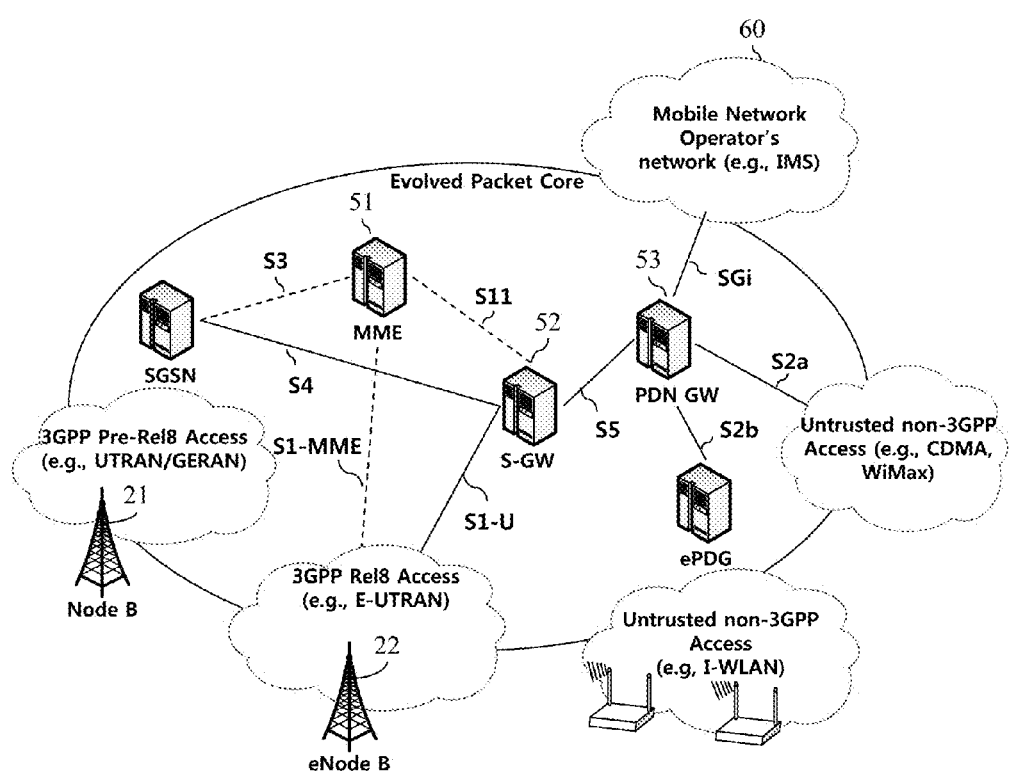
FIG. 1 shows the configuration of an evolved mobile communication network.
Figure 2:
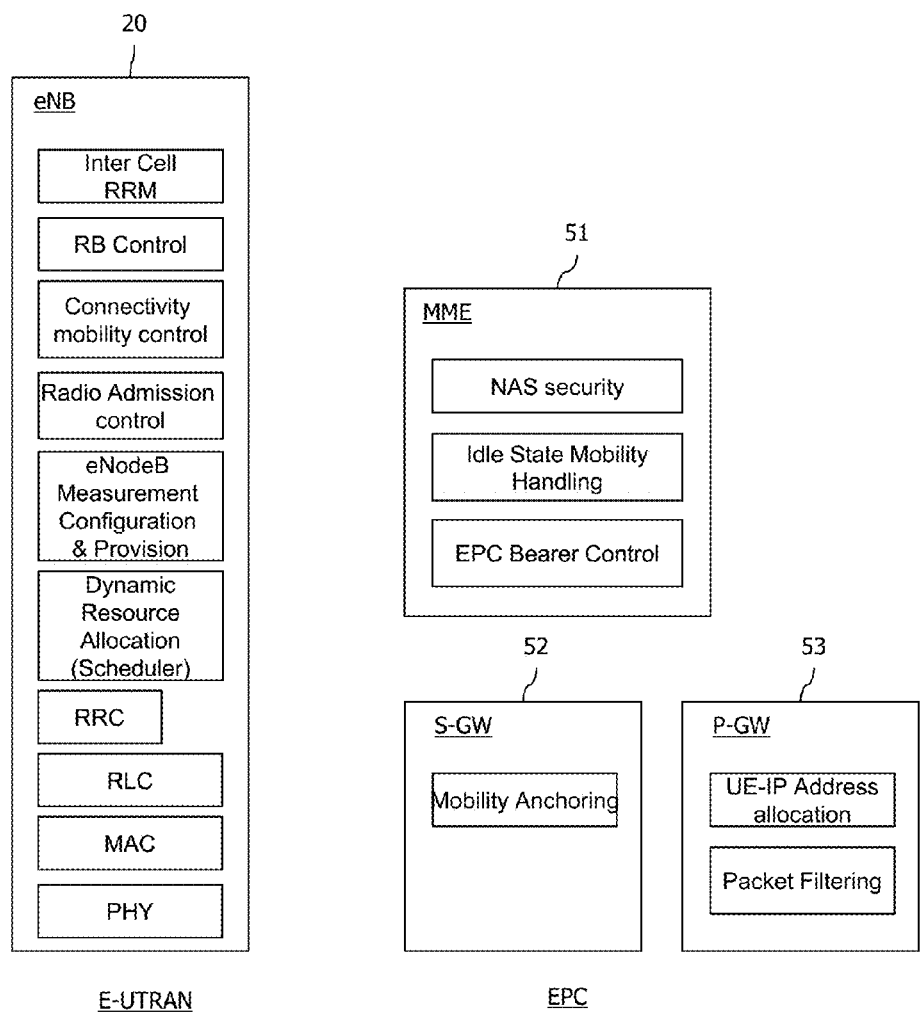
FIG. 2 is an exemplary diagram showing the architecture of a common E-UTRAN and a common EPC.
Figure 3:
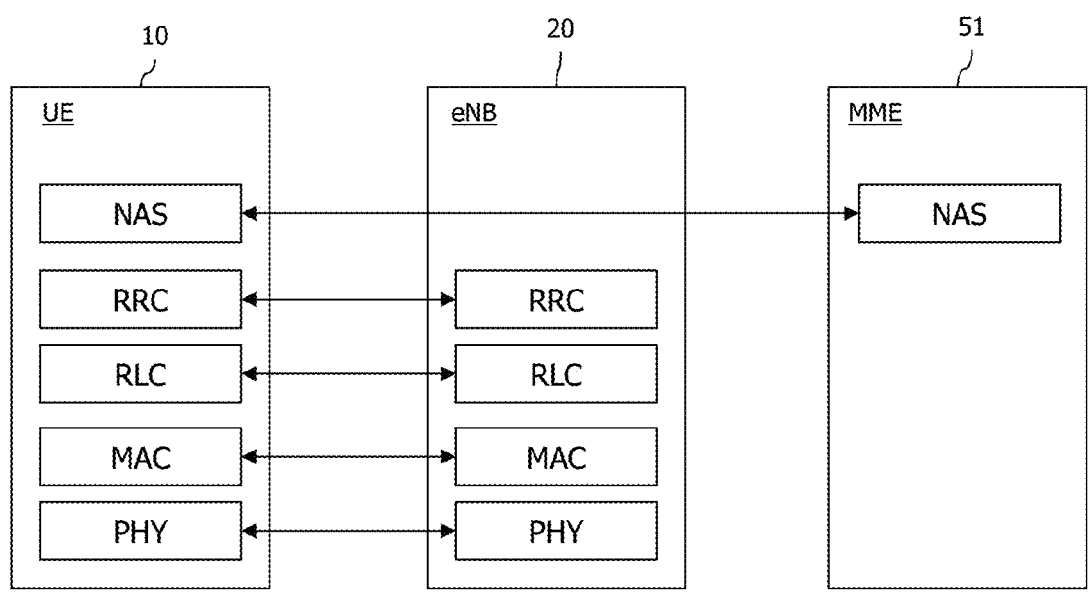
FIG. 3 is an exemplary diagram showing the structure of a radio interface protocol in a control plane between UE and an eNodeB.
Figure 4:
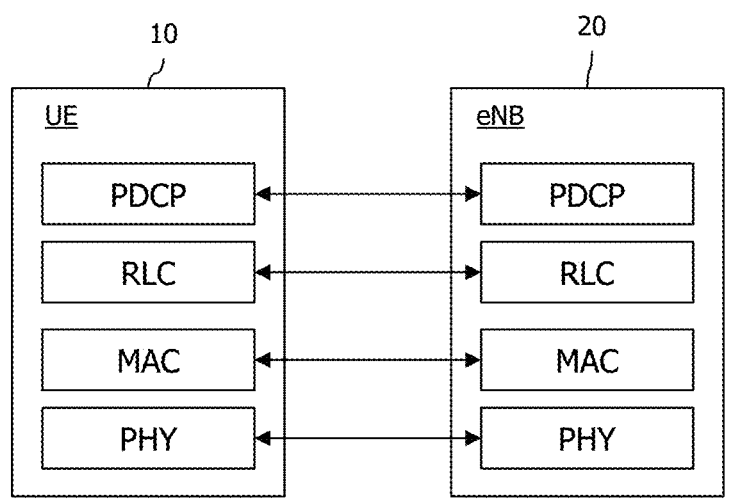
FIG. 4 is another exemplary diagram showing the structure of a radio interface protocol in a user plane between UE and a base station.
Figure 5:
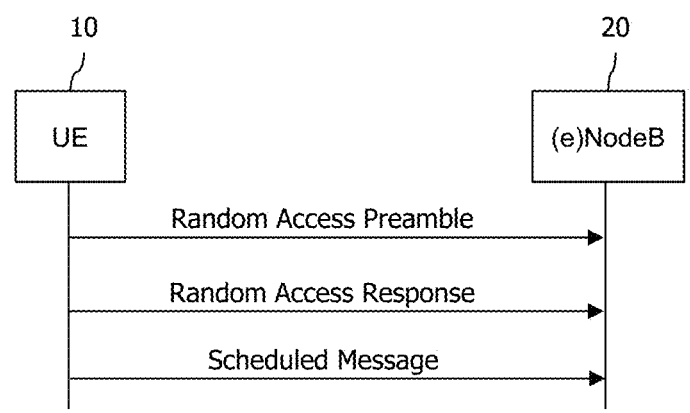
FIG. 5 is a flowchart illustrating a random access process in 3GPP LTE.
Figure 6A:
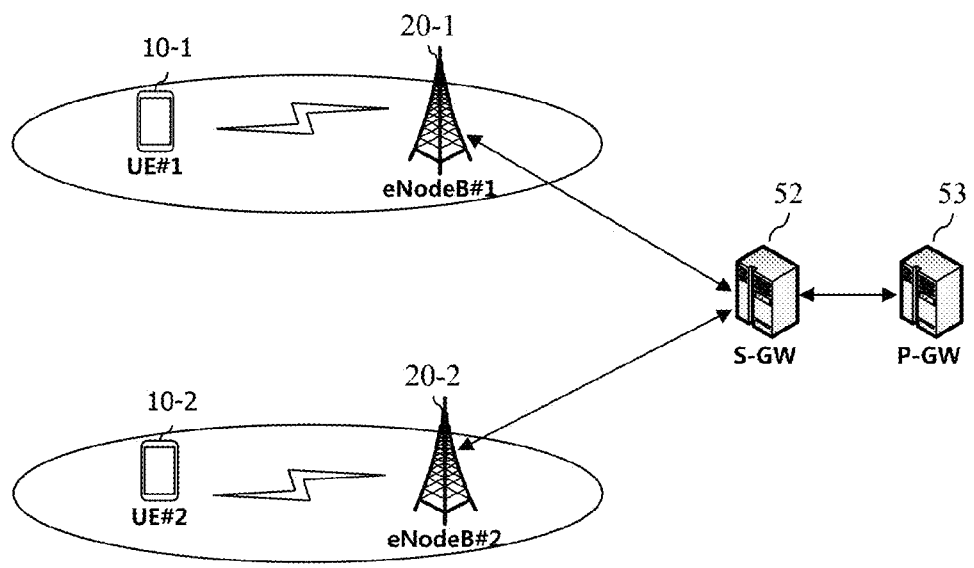
FIG. 6a is an exemplary diagram showing common communication.
Figure 6B:
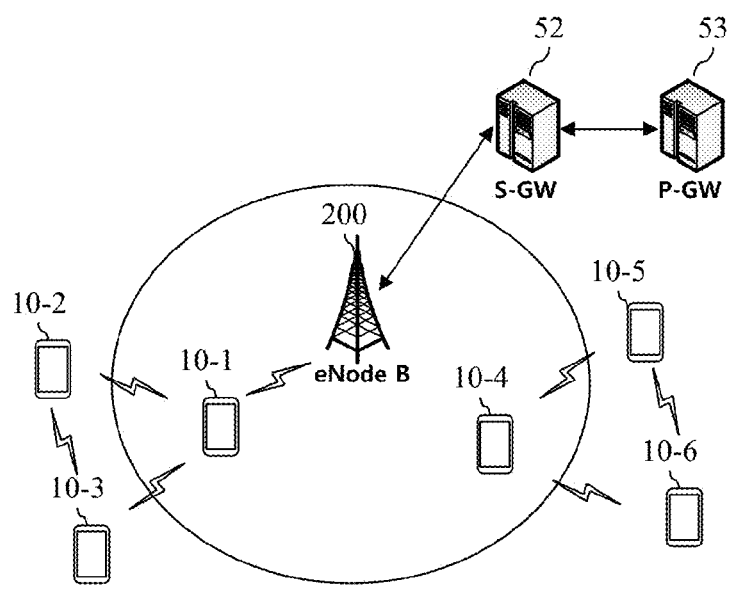
FIG. 6b shows the concept of proximity communication that is expected to be introduced in the next generation communication system.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art.

Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

DEFINITION OF TERMS

For a better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e)NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

NAS (Non-Access-Stratum): upper stratum of a control plane between a UE and an MME. Supports mobility management, session management, IP address management, etc. between a UE and a network.

RAT: an abbreviation of Radio Access Technology. Means GERAN, UTRAN, E-UTRAN, etc.

Proximity service (Proximity Service, ProSe Service or Proximity based Service): means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: means a rough distance range as a use for ProSe discovery, for example, a geographical distance range, and a distance range as a communication condition.

ProSe-enabled UE: means a UE supporting ProSe discovery, ProSe communication and/or ProSe-supported WLAN direct communication. In the present specification, the ProSe-enabled UE is also referred to as UE simply.

Announcing UE: a UE that notifies of information that can be used by adjacent UEs having discovery rights.

Monitoring UE: a UE that receives interested information from other adjacent UEs.

ProSe-enabled Network: means a network supporting ProSe discovery, ProSe communication and/or ProSe-supported WLAN direct communication. In the present specification, the ProSe-enabled Network is also referred to as network simply.

ProSe discovery: refers to a process of discovering a ProSe-enabled UE when it is closely located.

Open ProSe Discovery: means that it is possible to discover a ProSe-enabled UE without a direct permission when detecting it.

Restricted ProSe Discovery: means that it is possible to discover a ProSe-enabled UE only with a direct permission when detecting it.

ProSe Communication: means performing communication between UEs using an E-UTRAN communication path when a ProSe-enabled UE is closely located. A communication path may be established, for example, directly between UEs or via a local (or neighbor) eNodeB.

ProSe Broadcast Communication: means performing one-to-all broadcast communication using a common communication path established between ProSe-enabled UEs when they are located adjacent to each other.

ProSe Group Communication: means performing one-to-all group communication using a common communication path established between two or more ProSe-enabled UEs when they are located adjacent to each other.

ProSe UE-to-Network Relay: means playing a role of a communication repeater between a ProSe-enabled Network and a ProSe-enabled UE.

ProSe UE-to-UE Relay: means playing a role of a communication repeater between ProSe-enabled UEs.

Meanwhile, the embodiments of the present invention are described with reference to the drawings below.

Figure 7A:
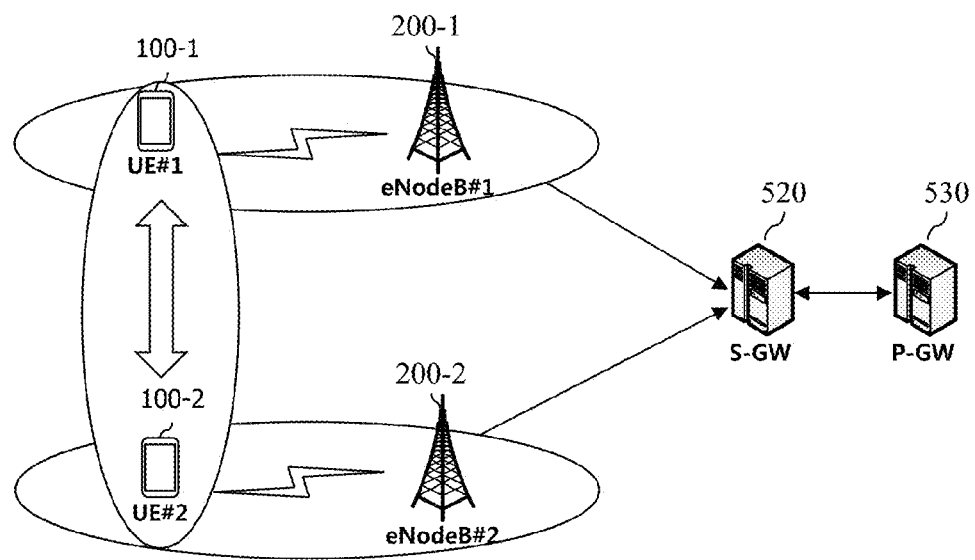
FIG. 7a is an exemplary diagram showing an example of proximity communication.
Figure 7B:
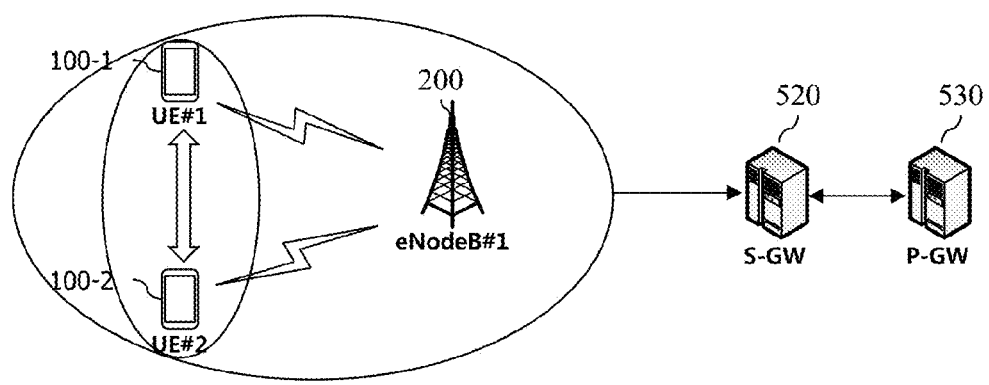
FIG. 7b is an exemplary diagram showing another example of proximity communication.

FIG. 7a is an exemplary diagram showing an example of proximity communication, and FIG. 7b is an exemplary diagram showing another example of proximity communication.

Referring to FIG. 7a, there is illustrated a situation that a UE#1 100-1 and a UE#2 100-2 perform proximity communication through a direct communication path while camping on different eNodeBs, respectively. Referring to FIG. 7b, there is shown a situation that a UE#1 100-1 and a UE#2 100-2 perform proximity communication through a direct communication path while camping on an eNodeB 200, respectively.

As such, the UE#1 100-1 and the UE#2 100-2 may perform proximity communication through a direct communication path bypassing a path through an eNodeB and a core network that a service provider operates.

The term, direct communication path, may be variously referred to as data path for proximity service, data path based on proximity service or proximity service communication path. Furthermore, communication through the direct communication path may be variously called direct communication, proximity service communication or proximity service-based communication.

Figure 8:
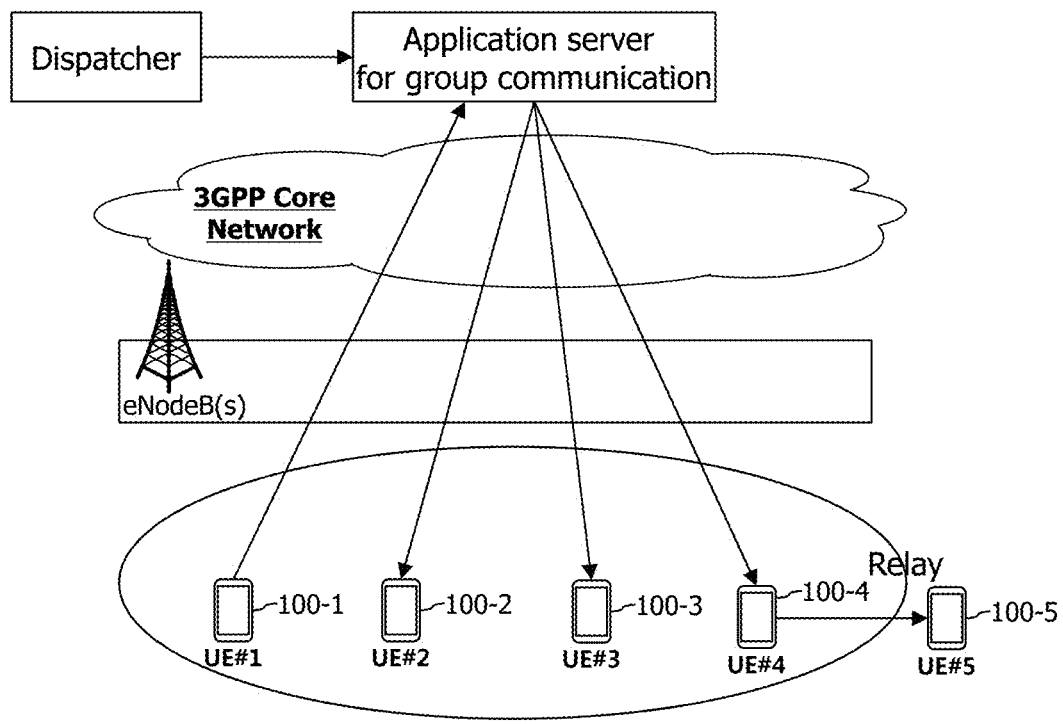
FIG. 8 shows architecture for group communication service as an example of proximity service.

FIG. 8 shows architecture for group communication service as an example of proximity service.

As shown in FIG. 8, a UE#1 100-1, a UE#2 100-2, a UE#3 100-3, a UE#4 100-4 and a UE#5 100-5 have joined a group communication service provided by an application server and all have belonged to a same group. The group may be managed by a dispatcher illustrated in FIG. 8.

A service such as Push-To-Talk (PTT) can serve as an example of the group communication service. When the group communication service is described with an example of the PTT service, a UE may become a talking party in group communication and transmit media (e.g. voice), and a plurality of other UEs may receive the media from the UE of the talking party. Here, several UEs cannot simultaneously become talking parties and transmit media.

Assuming that the UE#1 100-1 performs discovery in the group, the UE#2 100-2, the UE#3 100-3 and the UE#4 100-4 are within a discovery range of the UE#1 100-1, but the UE#5 100-5 is out of the discovery range. For the UE#5 100-5, the UE#4 100-4 may operate as a repeater.

The discovery range may be divided into three kinds of classes, e.g. short, medium and maximum ranges. A service provider enables each subscriber to set whether discovery is possible in any range class. Here, an application may discover another UE with a certain range class. Similarly, the application enables a UE to be detected by another UE only under a particular range class.

Figure 9A:
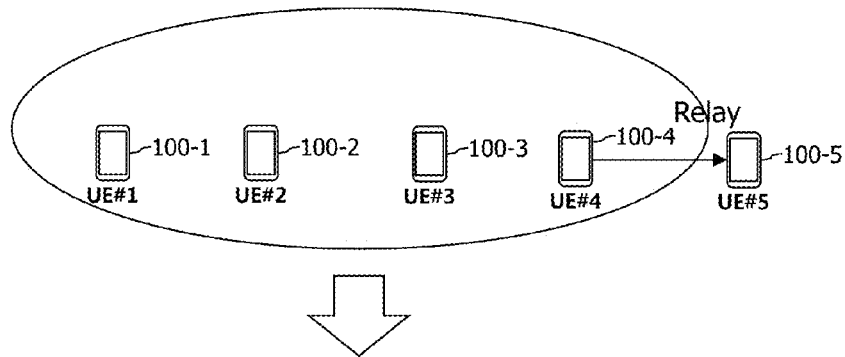
FIGS. 9a, 9b, and 9c are exemplary diagrams showing issues caused by non-adjustment of a discovery range class that cannot be adjusted.
Figure 9A:
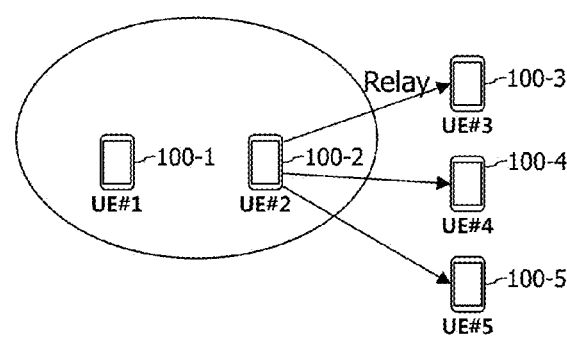
Figure 9B:
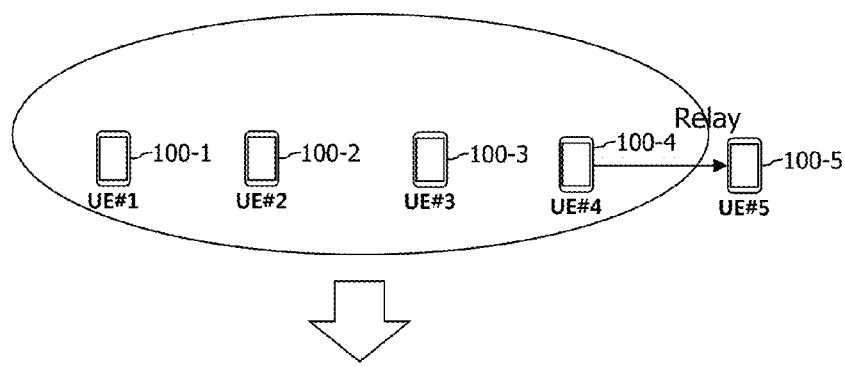
Figure 9B:
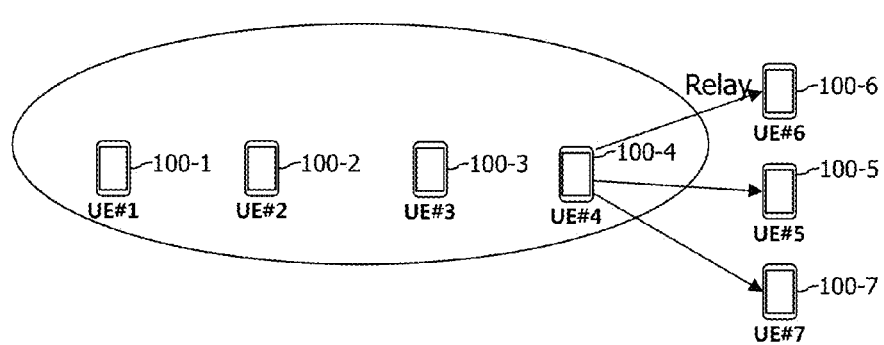
Figure 9C:
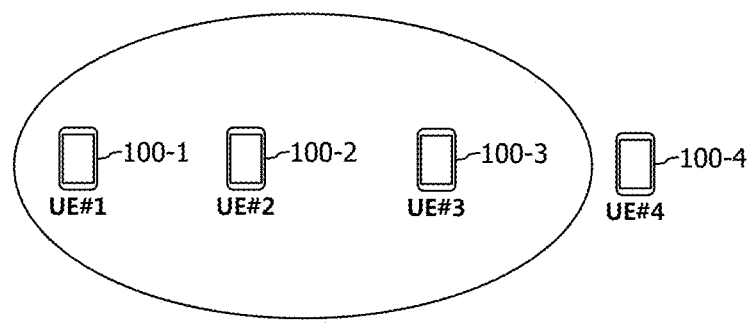

FIGS. 9a, 9b, and 9c are exemplary diagrams showing issues caused by non-adjustment of a discovery range class.

As shown in the top of FIG. 9a, a UE#1 100-1, a UE#2 100-2, a UE#3 100-3, a UE#4 100-4 and a UE#5 100-5 have joined a group communication service and all have belonged to a same group.

Assuming that the UE#1 100-1 performs discovery in the group, the UE#2 100-2, the UE#3 100-3 and the UE#4 100-4 are within a discovery range of the UE#1 100-1, but the UE#5 100-5 is out of the discovery range. For the UE#5 100-5, the UE#4 100-4 may operate as a repeater.

However, as shown in the bottom of FIG. 9a, the UE#3 100-3 and the UE#4 100-4 belonging to the group are increasingly moving away from the discovery range and they are relayed by the UE#4 100-4.

Similarly, as shown in the bottom of FIG. 9b, a UE#6 100-6 and a UE#7 100-7 newly join the group, but when they are out of a discovery range of a UE#1 100-1, they are relayed by a UE#4 100-4.

As such, if the number of UEs relayed by the UE#4 100-4 increases, the burden of the UE#4 100-4 grows heavier. That is, signaling of the UE#4 100-4 rises, so power consumption is very greatly increased.

Meanwhile, as shown in FIG. 9c, when a discovery range of a UE#1 100-1 is smaller than a distribution of the group members, the UE#1 100-1 may not discover a UE#4 100-4. Even if the UE#1 100-1 did not directly discover the UE#4 100-4, the UE#1 100-1 may discover the UE#4 100-4 via a UE#3 100-3 that can play a role of a repeater. However, like this, even though the UE#1 100-1 may discover the UE#4 100-4 via the UE#3 100-3, communication with the UE#4 100-4 may not always be possible.

Thus, the purpose of a first embodiment of the present invention is to propose a scheme that enables communication without relay through the adjustment (i.e. the adjustment of a range class) of a discovery (and/or communication) range in the situations shown in FIGS. 9a, 9b, and 9c. As such, a flexible update/management of a discovery (and/or communication) range enables provision of an efficient service. Here, the range class may be adjusted to increase but, on the contrary, adjusted to decrease so that a data transfer rate and a data transfer success rate can be increased.

Figure 10:
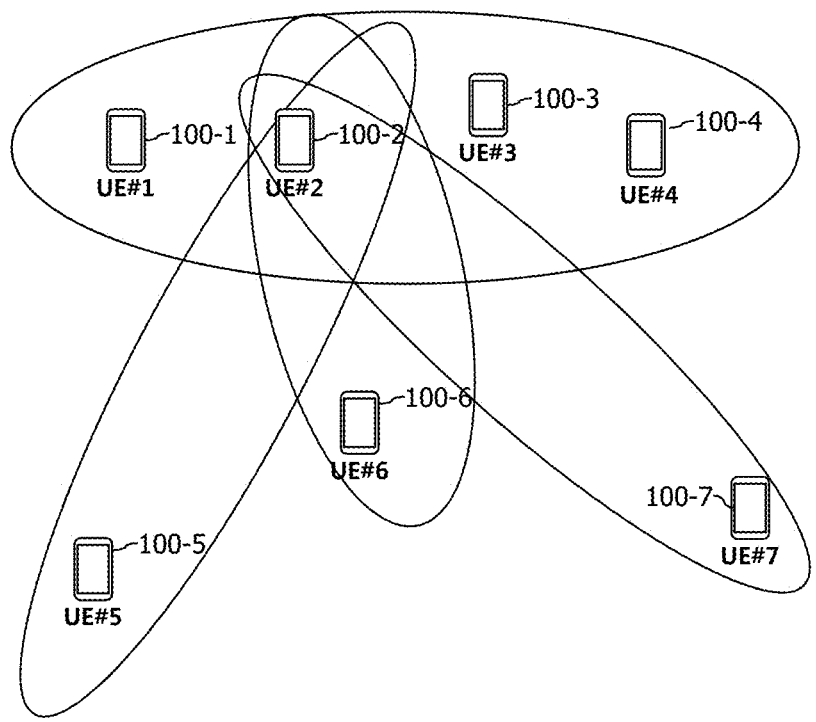
FIG. 10 is an exemplary diagram showing another issue caused by non-adjustment of a discovery range class.

FIG. 10 is an exemplary diagram showing another issue caused by non-adjustment of a discovery range class.

As shown in FIG. 10, a UE#1 100-1, a UE#2 100-2, a UE#3 100-3, and a UE#4 100-4 belong to a group of a certain service, and a UE#1 100-1 may discover members included in the group. However, there is a problem that the UE#2 100-2 may be discovered by a UE#5 100-5, a UE#6 100-6, or a UE#7 100-7 in other groups which the UE#2 100-2 did not join.

This problem causes another one that even though a user of the UE#2 100-2 is reluctant to receive an excessive number of advertising or spam messages, the UE#2 100-2 is discovered by the remote UE#5 100-5 or UE#7 100-7, being unnecessarily exposed thereto.

Thus, the purpose of a second embodiment of the present invention is to propose a scheme that is able to set a range class of discovery per application or group. According to the second embodiment, a range class is set per application or joined group of a desired service, preventing an unnecessary exposure of a UE to discovery. Furthermore, like this, when the range class may be set per application or joined group of the desired service, a discovering UE may perform discovery more efficiently.

<Brief Description of Solutions Proposed in a First Embodiment of the Present Specification>

The first embodiment of the present specification proposes a mechanism of controlling provision and update of a range class for a proximity service in a mobile communication system such as a 3GPP Evolved Packet System (EPS). Hereinafter, the range class is described as a range for discovering other UEs, but may be a range of discovery performed by other UEs.

The provision and update of the range class may be performed with one among the following various means or a combination thereof.

1) Provision and update of a range class from a network to a UE

The network provides an initial UE with a range class.
When an update is required later, the network transfers only an updated item to the UE.
When the UE sends the network a request for a range class or not, the network may provide the UE with the range class.

2) A network or UE recognizes a need for provision/update of a range class to a certain UE or a particular application of a specific UE on the basis of one or more among the following various elements.

Recognize the situations illustrated in FIGS. 9a, 9b and 9c.
The UE recognizes the number of group members or the number of UEs belonging to a repeater based on information received from other UEs.

3) Request for provision/update of a range class by a UE
When the UE simply sends a network a request for an update of a range class, the network determines whether to update the range class and determines an increase or decrease in the range class.

The UE may directly request an increase or decrease in a range class. Here, the UE may directly send the network a request for an update to a certain range class. The UE may also classify and request a range class for discovering other UEs and a range class of discovery performed by other UEs.

4) A network node requests ProSe-related information collected in an RAN (e.g. an eNB).

Whether to transfer discovery relationship and ACK/NACK between two UEs when the eNB is involved in a ProSe service.

5) A network node updates a range class and then notifies a UE of the update of the range class.

The first embodiment may be applied to the overall UMTS/EPS mobile communication system not being limited to an LTE/EPC network and including all of a 3GPP access network (e.g. an UTRAN/GERAN/E-UTRAN) and a non-3GPP access network (e.g. a WLAN). Furthermore, the first embodiment may be employed in a network control-adopted environment and all other wireless mobile communication system environment.

Hereinafter, operations according to the first embodiment will be described in detail with reference to the drawings.

Figure 11:
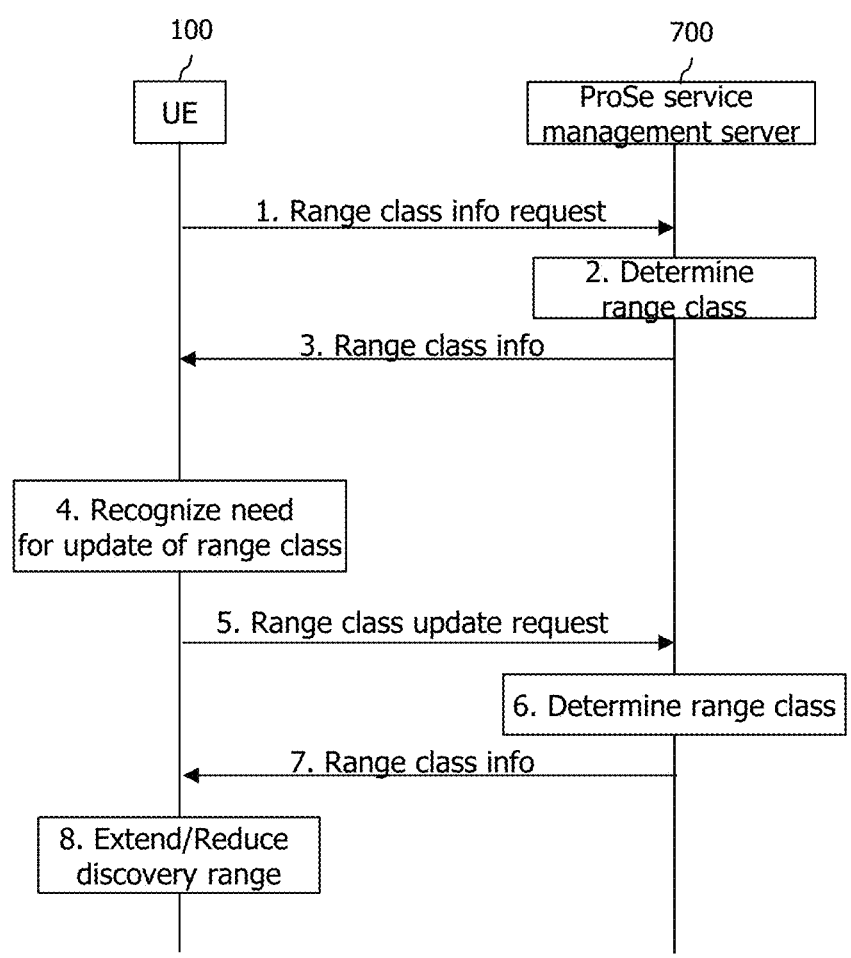
FIG. 11 is a flowchart illustrating a process in which UE sends a ProSe service management server a request for a range class according to a first embodiment.

FIG. 11 is a flowchart illustrating a process in which a UE sends a ProSe service management server a request for a range class according to a first embodiment.

As known with reference to FIG. 11, the UE 100 may transmit a range class information request message to the ProSe service management server 700. In this case, the ProSe service management server 700 may determine a range class of the UE 100 in response to the request and then transfer information on the determined range class to the UE 100.

Then, the UE 100 may perform search/communication with the range class according to the received information.

However, if the situations as shown in FIGS. 9a, 9b and 9c occur, the UE 100 recognizes that an update of the range class is required. For example, the UE 100 may recognize a need for the update of the range class due to the situation that the number of UEs requiring a relay exceeds a threshold value.

Thus, the UE 100 transmits a range class update request message to the ProSe service management server 700. In this case, the ProSe service management server 700 may update the range class of the UE 100 in response to the update request and then transfer information on the updated range class to the UE 100.

In this case, the UE 100 may expand or reduce the discovery range according to the updated range class.

Alternatively, the UE 100 may directly update the range class and notify the ProSe service management server 700 of the update of the range class, without transmission of the update request message.

Figure 12:
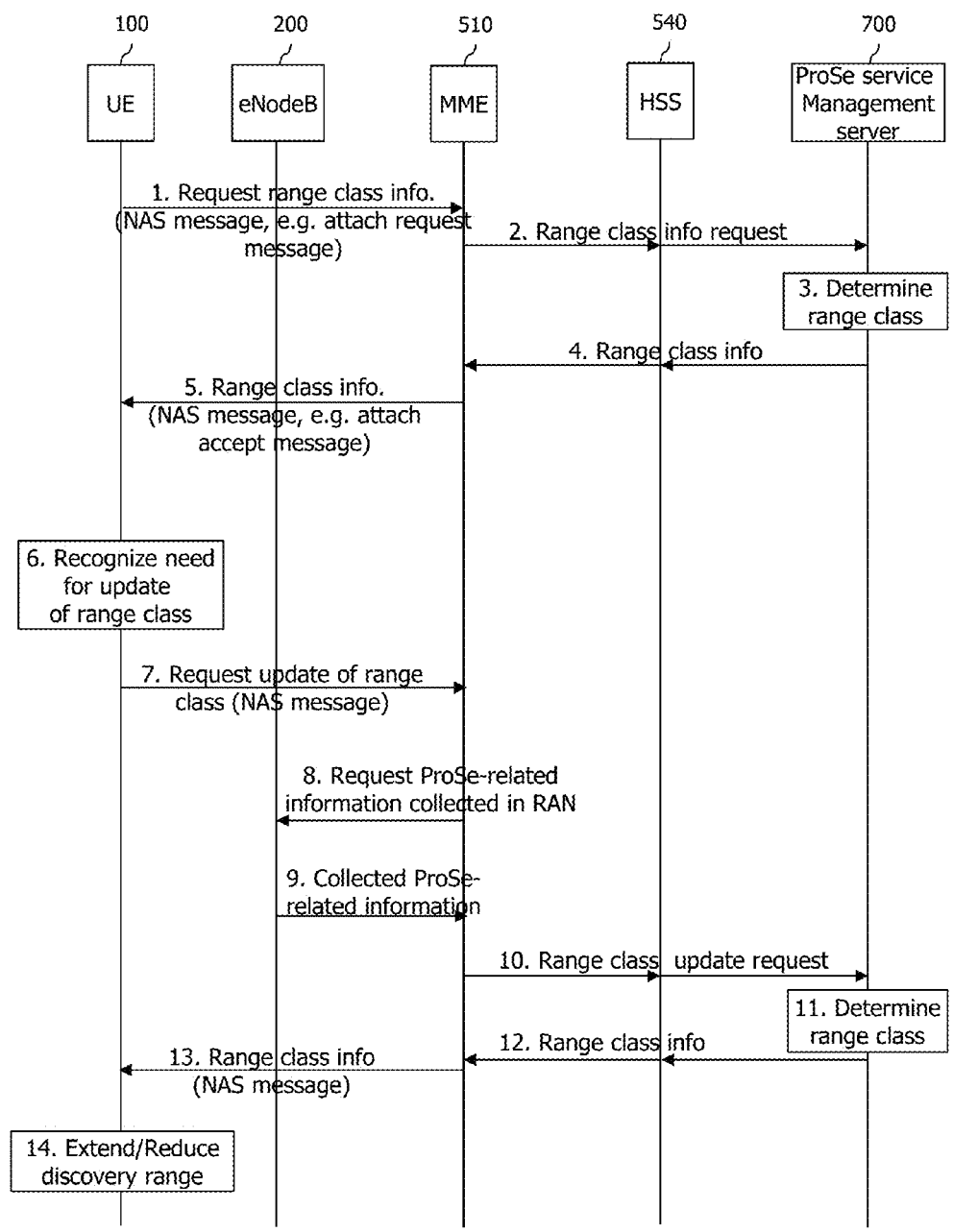
FIG. 12 is a flowchart illustrating a process in which UE sends a ProSe service management server a request for a range class through an MME according to a first embodiment.

FIG. 12 is a flowchart illustrating a process in which a UE sends a ProSe service management server a request for a range class through an MME according to a first embodiment.

AS known with reference to FIG. 12, a UE 100 may transmit a range class information request message to an MME 510. The range class information request message transmitted to the MME 510 may be included in a conventional NAS message, e.g. an attach request message. Included in the conventional NAS message, the range class information request message may be represented with an indicator or parameter in the conventional NAS message. Or, the range class information request message transmitted to the MME 510 may be included in a new NAS message.

In this case, the MME 510 may transfer the range class information request message to a ProSe service management server 700 directly or via an HSS 540. When the MME 510 transfers the range class information request message to the ProSe service management server 700 via the HSS 540, a conventional message, e.g. an update location message, may be used between the MME 510 and the HSS 540. Furthermore, in this case, a conventional message, e.g. an insert subscriber data message, may be utilized between the HSS 540 and the ProSe service management server 700.

Then, the ProSe service management server 700 may determine a range class of the UE 100 in response to the request and transfer information on the determined range class to the MME 510 directly or via the HSS 540. The range class may be exclusively determined by the ProSe service management server 700, but may be determined by a cooperation between the MME 510 and the HSS 540.

When the ProSe service management server 700 transfers the information on the determined range class to the MME 510 via the HSS 540, a conventional message, e.g. an insert subscriber data ACK message, may be utilized between the HSS 540 and the ProSe service management server 700. Furthermore, in this case, a conventional message, e.g. an update location answer message, may be used between the MME 510 and the HSS 540.

Next, the MME 510 transfers the information on the range class to the UE 100. The information on the range class transferred to the UE 100 may be included in an NAS message, e.g. an attach accept message. Or, the information on the range class transmitted to the MME 510 may be included in a new NAS message.

However, if the situations as shown in FIGS. 9a, 9b and 9c occur, the UE 100 recognizes that an update of the range class is required. For example, the UE 100 evaluates information (e.g. the size of the group, the number of discoverable UEs belonging to the group, and the number of UEs requiring a relay) related to a group from information received from other neighbor UEs, recognizing whether an update of the range class is required. For a more specific example, the UE 100 may recognize a need for the update of the range class due to the situation that the number of UEs requiring a relay exceeds a threshold value.

Thus, the UE 100 transmits a range class update request message to the MME 510. The range class update request message may be included in a conventional NAS message, e.g. a Tracking Area Update (TAU) request message. Included in the conventional NAS message, the range class information request message may be represented with an indicator or parameter in the conventional NAS message. Or, the range class information request message transmitted to the MME 510 may be included in a new NAS message. Alternatively, the UE 100 may directly update the range class and notify the MME 510 of the update of the range class, without transmission of the update request message.

In this case, the MME 510 may send an eNodeB 200 a request for collected ProSe-related information and obtain it therefrom before sending the ProSe service management server 700 an update request.

Subsequently, the MME 510 may transfer the range class update request message to the ProSe service management server 700 directly or via the HSS 540. Here, the collected ProSe-related information may be transferred to the ProSe service management server 700 together with the range class update request message, When the MME 510 transfers the range class update request message to the ProSe service management server 700 via the HSS 540, a conventional message, e.g. an update location message, may be used between the MME 510 and the HSS 540. Furthermore, in this case, a conventional message, e.g. an insert subscriber data message, may be utilized between the HSS 540 and the ProSe service management server 700.

Then, the ProSe service management server 700 may update the range class of the UE 100 in response to the request and transfer information on the updated range class to the MME 510 directly or via the HSS 540. The range class may be exclusively updated by the ProSe service management server 700, but may be updated by a cooperation between the MME 510 and the HSS 540.

Next, the MME 510 transfers the information on the updated range class to the UE 100. The information on the updated range class transferred to the UE 100 may be included in an NAS message, e.g. a TAU accept message. Or, the information on the updated range class transmitted to the MME 510 may be included in a new NAS message.

In this case, the UE 100 may expand or reduce the discovery range according to the updated range class.

The foregoing steps do not mean that they all should be performed, but may be expanded and applied to various embodiments with a number of combinations.

According to the first embodiment described above, the discovery range class may be flexibly updated/managed, and thus network signaling of a UE that plays a role of relay may be reduced and battery consumption may be decreased.

<Brief Description of Solutions Proposed in the Second Embodiment of the Present Specification>

Thus, the second embodiment of the present invention proposes a scheme that is able to set a range class of discovery per application or group. However, even though a range class of discovery is set per application or group, a physical layer may not classify the range class. Thus, to solve this, there are required an internal procedure for a transmitting UE and an internal procedure for a receiving UE. Hereinafter, the internal procedures will be described with reference to FIG. 13 as follow.

Figure 13:
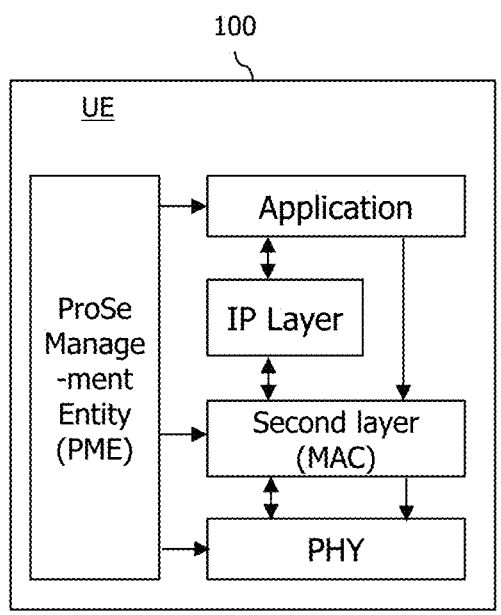
FIG. 13 is an exemplary diagram showing the structure of UE for describing an internal procedure to establish a range class of discovery per application or group.

FIG. 13 is an exemplary diagram showing the structure of a UE for describing an internal procedure to establish a range class of discovery per application or group.

1. The Internal Procedure for a Transmitting UE

When an application shown in FIG. 13 receives a discovery request from a user, the application transfers range class setting information together with the discovery request to a physical layer through a second layer.

The range class setting information may be transferred in the form of a parameter. Or the range class setting information may be represented with a certain part of a ProSe ID. For example, the range class setting information may have been set to perform discovery with any range class in response to a reception of any ID. The setting may be flexibly changed. Or the ProSe ID may be set to enable a network node (e.g. an MME and a ProSe server) to indicate a particular range class.

In this case, the physical layer sets a field value of a range class in a discovery message according to the setting. And the physical layer broadcasts the discovery message, to which the field value is set, according to the range class. When broadcasting the discovery message, the physical layer may group and broadcast several discovery messages per range class. Or the physical layer may broadcast the discovery message with a range class permitted to a UE regardless of application or service. The physical layer may broadcast the discovery message with the largest range class among range classes permitted to the application or service.

2. The Internal Procedure for a Receiving UE

A physical layer receives many discovery messages. Also, the physical layer measures the receive signal strength of each discovery message. The physical layer transfers the measured receive signal strength and the discovery message to the second layer.

The second layer or an application compares a field value of a range class included in the discovery message with the receive signal strength to calculate a distance. The principle of calculating the distance is as follows. In general, signal strength is inversely proportional to the nth (n is 3 or 4) power of distance. Thus, when the transmitting UE inserts information on alpha signal strength in a message and transmits the message when transferring the message with the alpha signal strength, and when the receiving UE receives the message with beta signal strength, the receiving UE may estimate the distance through a difference between the alpha and beta signal strengths.

When the distance is completely calculated, the receiving UE determines whether the discovery message is received within a range class set by itself or out of the range class, the receiving UE may filter the discovery message according to the determination result. For example, when a range class of the discovery message is out of the set range class and the calculated distance is larger than a predetermined threshold distance, the receiving UE may filter the discovery message without transferring it to the application.

As such, the receiving UE may be prevented from being unnecessarily exposed to discovery by filtering the discovery message.

The content described up to now can be implemented in hardware. This will be described with reference to FIG. 14.

Figure 14:
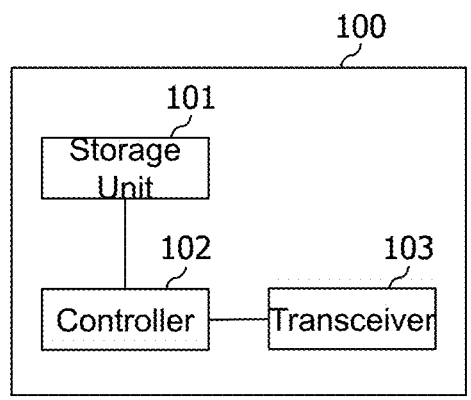
FIG. 14 is a block diagram showing the configuration of UE 100 according to an embodiment of the present invention.

FIG. 14 is a block diagram of a UE 100 according to an embodiment of the present invention.

As shown in FIG. 14, the UE 100 includes a storage means 101, a controller 102, and a transceiver 103.

The storage means 101 stores the aforementioned methods.

The controller 102 controls the storage means 101 and the transacted 103. More specifically, the controller 102 executes each of the aforementioned methods stored in the storage means 101. The controller 102 transmits the aforementioned signals via the transacted 103.

Although exemplary embodiments of the present invention have been described above, the scope of the present invention is not limited to the specific embodiments and the present invention may be modified, changed, or improved in various ways within the scope of the present invention and the category of the claims.

What is claimed is:

1. A method for adjusting a discovery range for a proximity service, the method performed by a user equipment (UE) that performs discovery and comprising:

Comparing, by the discovering UE that has joined the same group of the proximity service, the number of UEs requiring a relay with a predetermined threshold value;

determining, by the discovering UE, whether an extension of its discovery range is required when the number of UEs requiring a relay exceeds the predetermined threshold value;

determining, by the discovering UE, whether a reduction in its discovery range is required when the number of UEs requiring a relay is less than the predetermined threshold value; and expanding or reducing, by the discovering UE, the discovery range by adjusting the range class, according to the determination result.

2. The method of claim 1, wherein the expanding or reducing step of the discovery range comprises:
   transmitting a range class update request message to a network node according to the determination result;
   receiving the updated range class information from the network node; and
   adjusting the range class according to the received information.

3. The method of claim 2, wherein the expanding or reducing step of the discovery range comprises transferring the received information to an IP or Medium Access Control (MAC) layer to adjust the range class.

4. The method of claim 2, wherein when the network node is a Mobility Management Entity (MME), the range class update request message is transmitted in a Non-Access-Stratum (NAS) message, and the updated range class is received in the NAS message.

5. The method of claim 2, wherein the network node is a proximity service-related server.

6. The method of claim 1, further comprising:
   generating a discovery request message including a field value according to the adjusted range class, in response to a discovery request, after the discovery range is expanded or reduced; and
   broadcasting the generated discovery request message with signal strength according to the adjusted range class.

7. A user equipment (UE) capable of adjusting a discovery range for a proximity service, the UE comprising:
   a transceiver; and
   a controller operatively connected with transceiver thereby controlling the transceiver, wherein the controller is configured to:
   compare the number of UEs having joined the same group of the proximity service and requiring a relay with a predetermined threshold value;
   determine whether an extension of its discovery range is required when it is confirmed that the number of UEs requiring a relay exceeds the predetermined threshold value according to the comparison result;
   determine whether a reduction in its discovery range is required when the number of UEs requiring a relay is less than the predetermined threshold value according to the comparison result; and
   expanding or reducing the discovery range by adjusting a range class according to the determination result.

8. The UE of claim 7, wherein in order to expand or reduce the discovery range, the controller is configured to:
   transmit a range class update request message to a network node through the transceiver; and
   adjust the range class according to received updated range class information when the updated range class information is received from the network node through the transceiver.

9. The UE of claim 8, wherein in order to expand or reduce the discovery range, the controller is configured to:
   transmit the received information to an IP or MAC layer, adjusting the range class.

10. The UE of claim 8, wherein when the network node is a Mobility Management Entity (MME), the range class update request message is transmitted in a Non-Access-Stratum (NAS) message, and the updated range class is received in the NAS message.

11. The UE of claim 8, wherein the network node is a proximity service-related server.

12. The UE of claim 7, wherein after expanding or reducing the discovery range, the controller is configured to:
   generate a discovery request message including a field value according to the adjusted range class in response to a discovery request; and
   broadcast the generated discovery request message with signal strength according to the adjusted range class through the transceiver.

* * * * *